May 24, 1966  W. F. BREWER  3,252,276
FLAIL TYPE CUTTER
Filed May 20, 1965  5 Sheets-Sheet 1
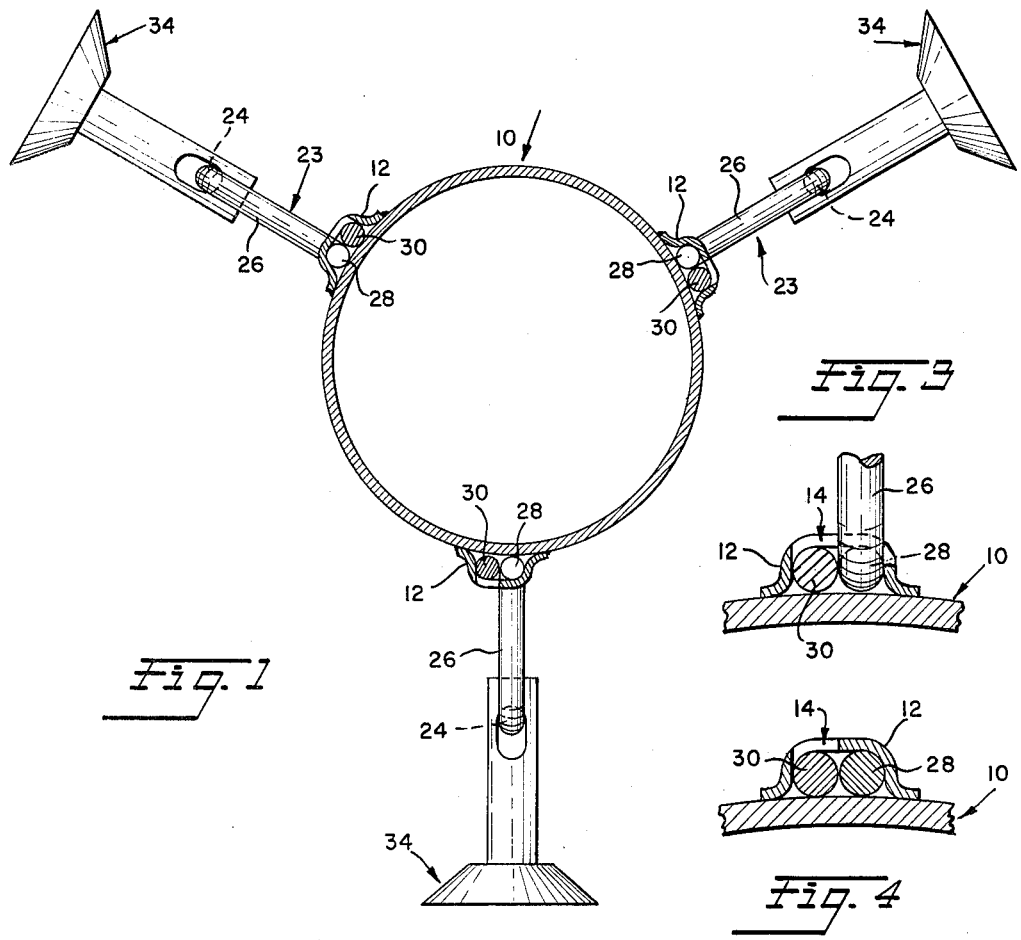
INVENTOR
WILLIE F. BREWER
BY
Scrivener, Parker, Scrivener & Clarke
ATTORNEYS

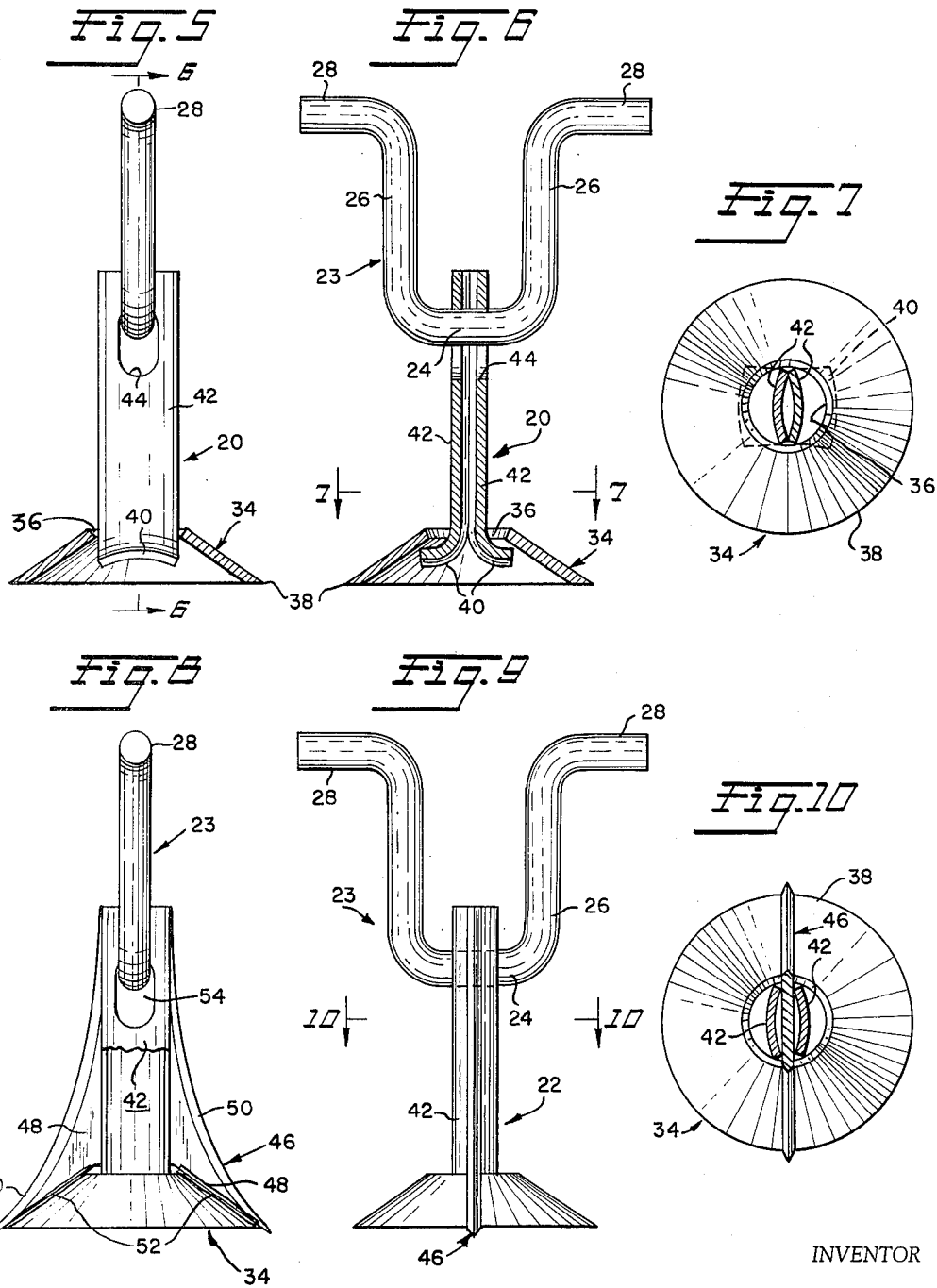

INVENTOR
WILLIE F. BREWER

May 24, 1966 W. F. BREWER 3,252,276
FLAIL TYPE CUTTER
Filed May 20, 1965 5 Sheets-Sheet 4

INVENTOR
WILLIE F. BREWER

BY
Scrivener Parker Scrivener & Clarke
ATTORNEYS

May 24, 1966     W. F. BREWER     3,252,276
FLAIL TYPE CUTTER

Filed May 20, 1965     5 Sheets-Sheet 5

INVENTOR
WILLIE F. BREWER

BY
Scrivener Parker Scrivener & Clarke
ATTORNEYS

United States Patent Office 3,252,276
Patented May 24, 1966

3,252,276
FLAIL TYPE CUTTER
Willie F. Brewer, Minden, La., assignor to Dealer Associates, Inc., Minden, La., a corporation of Louisiana
Filed May 20, 1965, Ser. No. 458,838
15 Claims. (Cl. 56—289)

This is a continuation-in-part of application Serial No. 376,703, filed June 22, 1964, and now abandoned.

This invention relates to flail type mowers or cutters.

Cutters of the type wherein a plurality of radially arranged, swingable or flailing cutters are driven rapidly about a horizontal axis to sever vegetation merely by impact of cutting elements are well known. The present invention is concerned with cutters of this class and has for a broad object the provision of an improved cutter having cutting elements of a self-sharpening nature and including greatly improved means for enabling individual cutter elements to be removed for replacement with a minimum of time and effort on the part of the operator.

More specifically it is an object of the invention to provide a flail type cutter having cutter elements which are frusto conical to provide an annular knife edge, the elements being freely rotatable with respect to swinging flail type support means whereby a sharp edge part of the element is continuously presented to the vegetation being cut.

Another more specific object of the invention is to provide improved keying or releasable locking means for the cutter element supports wherein it is possible to remove only one element at a time without the necessity of having to displace the remaining elements as has been necessary heretofore.

Other objects and their attendant advantages will become apparent when the following detailed description is read in conjunction with the accompanying drawings wherein:

FIG. 1 is a vertical cross-sectional view through a drum of a rotary cutter and showing features of the present invention;

FIG. 2 is a partial, enlarged plan view of a portion of the drum and related parts of FIG. 1;

FIG. 3 is a vertical cross-sectional view taken substantially on the line 3—3 of FIG. 2;

FIG. 4 is a vertical cross-sectional view taken substantially on the line 4—4 of FIG. 2;

FIG. 5 is a side elevational view, partly in section, of a flail type cutter constructed in accordance with the invention;

FIG. 6 is a vertical cross-sectional view taken substantially on the line 6—6 of FIG. 5;

FIG. 7 is a horizontal cross-sectional view taken substantially on the line 7—7 of FIG. 6;

FIG. 8 is a vertical side-elevational view showing the flail cutter of the invention in conjunction with a splitter blade;

FIG. 9 is a front-elevational view of the arrangement of FIG. 8;

FIG. 10 is a horizontal cross-sectional view taken substantially on the line 10—10 of FIG. 9;

Figure 11:
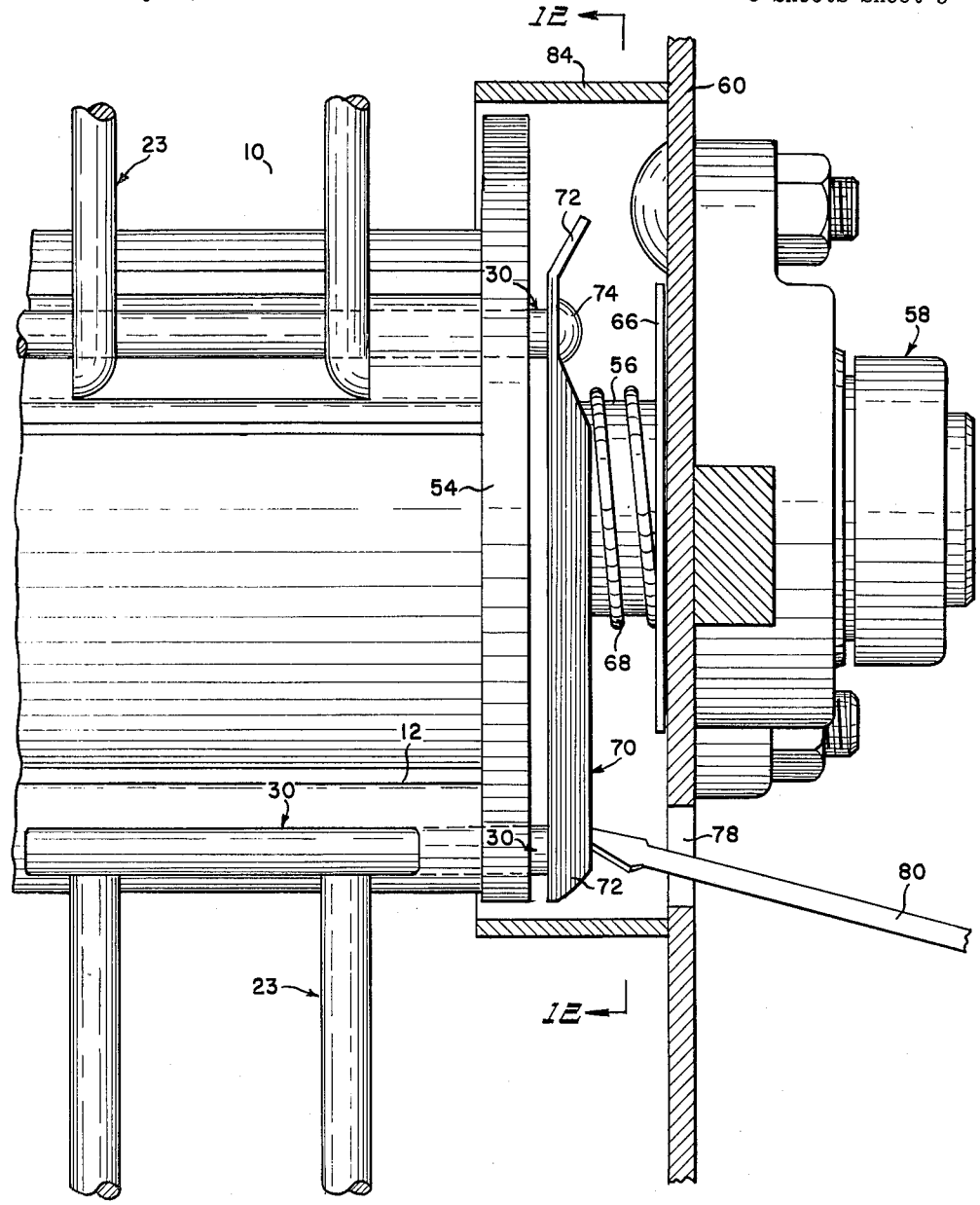
FIG. 11 is an enlarged detailed view partly in section and partly broken away showing means for releasably retaining the improved locking means of the invention in its position of use.

Referring now to FIG. 1 the numeral 10 designates a blade carrying drum which is adapted to be mounted for rotation in a frame (not shown) and driven in a conventional manner from the power take-off of a tractor. The drum extends transversely across the entire width of the cutter frame and fixed, as by welding or the like, to the exterior of the drum are a plurality of circumferentially spaced channel members 12 of inverted U-shape in cross-section and which extend substantially the entire length of the drum parallel to the axis thereof. Spaced along the length of each of the channel members 12 are openings as broadly indicated at 14 in FIG. 2. Each of the openings 14 comprises an elongated upper part or slot 16 and a shorter central lower part 18 which is in open communication with the upper part 16 and, in effect, defines a recess in the inner side of the slotted part of the opening.

As can be seen in FIGS. 6 and 9 the flail assemblies, broadly designated by the numerals 20 and 21 and hereinafter described in detail, include hanger members 23 having a U-shaped central part including a horizontal bar part 24 and vertical side parts 26 whose upper ends are bent laterally outwardly at substantially right angles to the side parts to provide transverse oppositely extending arm parts 28. In accordance with the invention, the upper or slotted part 16 of each opening 14 is sufficiently long to permit the insertion of the arm parts 28 into the interior of the channel members and the recessed parts 18 of the openings have a width which is slightly in excess of the outermost-transverse distance between the leg parts 26 of the U-shaped portion of the hangers 24. It will thus be seen that after the arm parts 28 have been inserted in the upper part 16 of an opening the hanger is then moved laterally until the leg parts 26 are accommodated in the recess portion 18. After each of the hanger elements have been thus inserted they are then, in accordance with the invention, releasably locked in position by slideably inserting into the channel from one end thereof a continuous rod 30 which positively prevents the hangers from moving from the position of FIG. 2 laterally upwardly into registry with the upper part 16 of the openings.

FIGS. 3 and 4 clearly illustrate the operation of the lock rod 30 and with this arrangement it will be apparent that when any hanger member is to be removed for any reason, such as the replacement of a cutting element, the rod 30 is withdrawn either entirely or partly so that it is free of the opening containing the hanger which is to be removed. It will be apparent that even if the rod 30 is completely withdrawn all of the hangers will remain in their working position with the arm parts 28 engaging the inner surface of the channel member 12 on either side of the recess 18 of the openings 14. In order to remove any one of the hangers it is only necessary to slide it laterally or circumferentially with respect to the drum until the arm parts register with the slot 16 of the opening 14 whereupon the hanger can be removed and a new hanger inserted with all of the hangers thereafter being locked in place by reinsertion of the rod 30.

Referring now to the flail assembly generally designated by the numeral 20 in FIGS. 5 through 7, it will be observed that the flail assembly, in addition to the above described hanger member 23 includes a cutter element 34 of frusto-conical configuration, not unlike a Belleville spring, and having a central annular opening 36 at its upper end and an annular knife edge 38 at its lower end. The blade elements 34 are supported for free rotation on the outturned end parts 40 of a pair of back-to-back support members 42 of heavy sheet metal construction, the outturned end parts 40 of the members 42 being curved, as can be seen in FIG. 5, to conform with the curvature of the inner surface of the blade elements 34. The width of the support members 42 is only slightly less than the diameter of the opening 36 of the cutter element so that the element, while being free to rotate is capable of only very limited lateral movement with respect to the support members.

Each support member is provided adjacent its upper end with an elongated opening 44 adapted to receive the horizontal part 24 of the hanger 23. The support members 42 are desirably not connected together in order that the upper ends may be free to slide slightly with respect to each other on the hanger in order to insure, as nearly as possible, uniform engagement of the cutter elements on the curved outturned parts 40 of the support members 42.

The arrangement illustrated in FIGS. 8 through 10 is substantially identical to that illustrated in FIGS. 5 through 7 and like reference characters identify like parts in all of the figures. The arrangement of FIGS. 8 through 10 differs only in the provision of a freely mounted knife or splitter member 46 which is received between the support members 42. As can be seen in FIG. 8 the knife member 46 is of flattened blade-like construction having two downwardly and outwardly diverging sides 48 each provided with a cutting edge 50. The lower edge of the knife member 46 is recessed at 52 to freely accommodate the cutting element 34, and each of the blades is provided with an opening 54 adapted to be received on the horizontal part 24 of the hanger members 23 between the support members.

In accordance with the invention, means are provided for releasably retaining the locking rods 30 in their position of use. With particular reference to FIG. 13 it will be observed that the roller 10 is provided at its ends with an integral flange 54 carrying a central stub shaft 56 journalled in bearings 58 bolted to a side wall part 60 of the mower. The stub shaft 56 is provided with a shoulder 62 and interposed between the shoulder and the inner race 64 of the bearing is an annular spacer element 66 which also functions as an abutment for the outer end of a compression spring 68 whose inner end bears against a triangular retainer plate 70 best shown in FIG. 12.

The plate 70 is rotatably mounted on the stub shaft 56 and is provided on all three sides with outwardly bent angularly related flanges 72. The apices of the triangular member 70 are pressed to provide three outwardly projecting part-spherical protuberances 74 affording recesses on the inner face of the plate 70 which are adapted to receive the chamfered ends 76 of the locking rods 30.

As illustrated in FIG. 13 the side wall 60 of the mower is provided with an opening 78 so that whenever it is desirable or necessary to remove a locking rod, it is only necessary to rotate the drum 10 until the appropriate rod is in alignment with the opening 78. Thereafter, as illustrated in FIG. 11, a screw driver or other like instrument 80 may be inserted through the opening 78 to engage an appropriate part of the retainer plate 70 and force it in one direction or the other until it is turned to the dotted line position of FIG. 12 wherein a side of the member 70 is in substantially radial alignment with the end of the rod to be removed. The spherical walls of the protuberance 74 enable the plate to be readily cammed to the left in FIG. 13 on the ends of these rods and against the spring until the retainer is clear of the rods. Thereafter the operator merely inserts a suitable tool, such as the pliers 82 shown in FIG. 13, into the opening 78 to engage the exposed outer end of the locking rod 30 and withdraw the rod to the required distance to enable removal of the appropriate cutter element as previously described.

Figure 12:
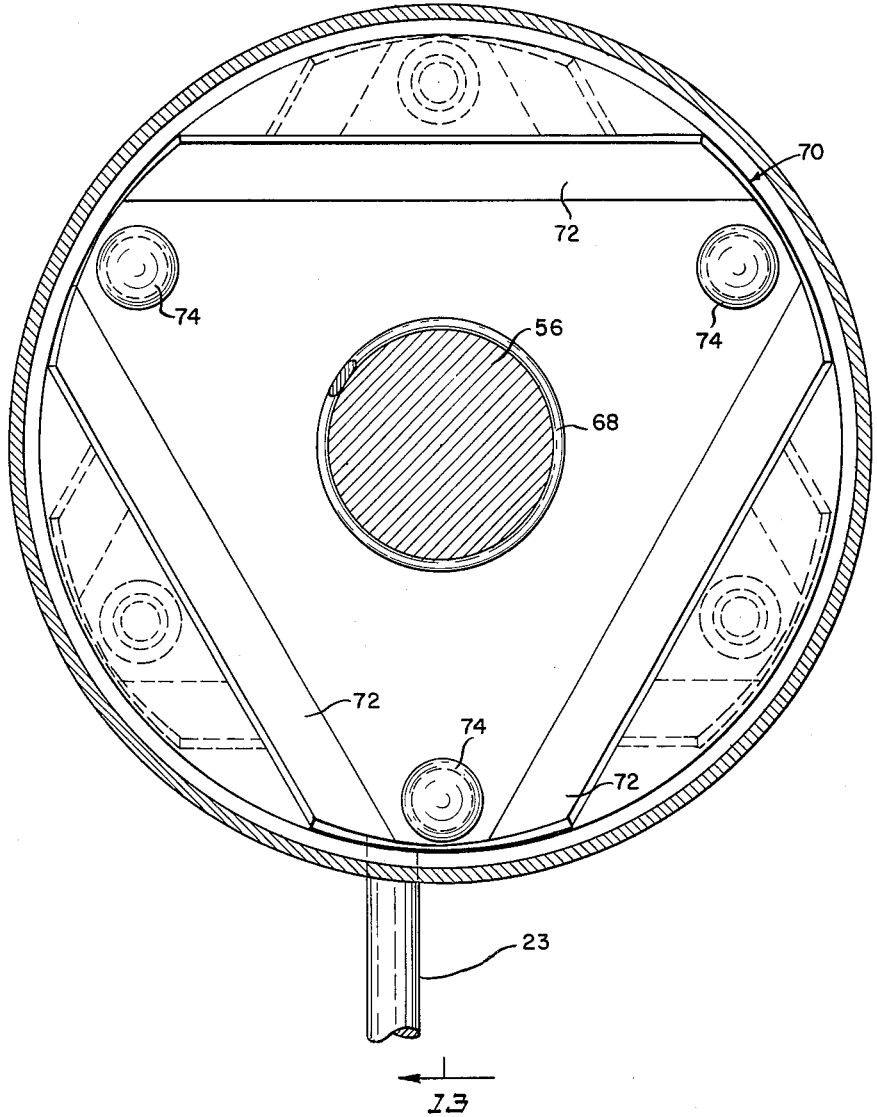
FIG. 12 is a vertical cross-sectional view taken substantially on the line 12—12 of FIG. 11.
Figure 13:
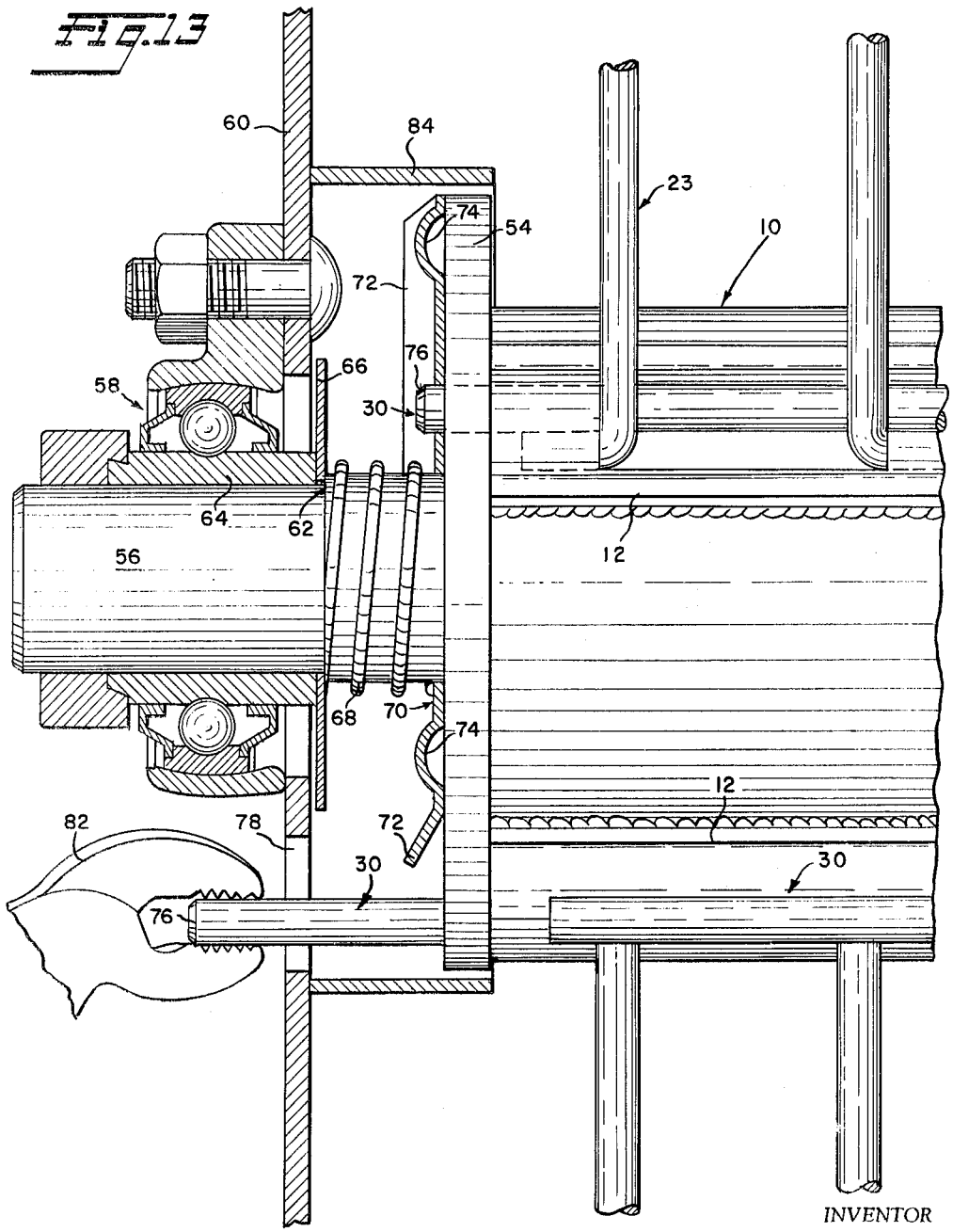
FIG. 13 is a vertical cross-sectional view taken substantially on the line 13—13 of FIG. 12.

After servicing and replacement of the cutter element the rod 30 is returned to its locking position and the tool 80 is engaged through the opening 78 with the retainer plate 70 to rotate this to the full line locking position of FIG. 12. During this rotation the flanges 72 serve to cam the plate outwardly against the spring 68 until the recesses 74 register with the ends of the rod whereupon the plate snaps into its locking position.

In order to protect the above described locking mechanism from being fouled by grass an annular sleeve 84 is rigidly fixed to the inner face of the side wall 60 and extends inwardly a sufficient distance to protect the retaining mechanism as clearly seen in FIGS. 11 and 13.

In operation, it will be apparent that when the drum 10 is rotated at a high rate of speed the cutter assemblies extend radially outwardly as in FIG. 1 and if it is assumed that travel of the motive vehicle or tractor is to the left in FIG. 1 the direction of rotation of the drum is counter clockwise to move the blade elements at a high rate of speed against the vegetation to be cut. The flails are arranged in staggered relationship so that the path defined by each element overlaps slightly the path of an element spaced circumferentially therefrom. Because each of the cutter elements is freely rotatable, as the mower advances through the vegetation the cutter elements are constantly rotated on their support members so that a fresh part of the cutting edge is being continuously presented to the vegetation whereby the edge is maintained for a far longer period of time than is possible in flail type mowers which have cutting edges having a fixed orientation with respect to the vegetation being cut. In other words, instead of the blades being rapidly dulled due to impact of the vegetation with the same spot on the blade, in accordance with the invention the blades constantly work about a vertical axis to present a different part of the cutting edge to the vegetation in each successive cutting stroke, thereby vastly increasing the length of time the element may be employed before the edge is uniformly dulled about its entire periphery. This should become apparent when it is realized that cutting elements constructed in accordance with the invention and having a larger diameter of 2¾", afford a cutting edge having a circumference slightly less than 9". Since only a part of the cutting edge is employed on each stroke and is constantly changed on successive strokes, it will be apparent that the cutting edge must retain its sharpness for longer than has been possible heretofore.

Whenever a cutter element must be replaced for resharpening or because of damage, the drum is rotated to a position wherein after removal of the locking rods 30 the hangers will not move transversely by gravity to a position where the hangers might drop through the slotted parts 16 of the openings 14 in the channel members 12. Thus after the key or locking rod 30 is removed all of the hangers remain in place with only those necessary being removed as previously explained.

From the foregoing description it should now be apparent that applicant has provided an improved flail type mower featuring cutter elements having a much longer cutting life than has been possible heretofore and also featuring improved releasable locking means whereby the cutter elements can be replaced with the rapidity which has simply not been possible heretofore. It will also be apparent to those skilled in the art that the invention is susceptible of a variety of modifications and changes without however departing from the scope and spirit of the appended claims.

What is claimed is:

1. A flail type cutter including a rotatable drum and a plurality of flails each including a hanger member comprising a central body part having outer and inner ends, a cutter element operatively connected to the outer end and a pair of oppositely extending transverse arms connected to said inner end, means for releasably fastening said flails to said drum comprising a plurality of circumferentially spaced elongated channel members rigidly joined to said drum, each of said channel members having a plurality of spaced elongated slots therethrough, each of said slots being of a size enabling the insertion of the arms of a hanger member into the interior of the interior of the channel members, a recess in an elongated side of each of said slots, said recesses having dimensions only slightly greater than the corresponding dimensions of the central body part of said hanger members whereby said hanger members are freely received within said recesses, and an elongated rod slidably received in each of said channel members and engaging a portion of each of said hanger members within said channel members to prevent the displacement thereof from their recesses.

2. A flail type cutter including a rotatable drum and a plurality of flails each including a hanger member comprising a central body part having outer and inner ends, a cutter element operatively connected to the outer end and a pair of oppositely extending transverse arms connected to said inner end, means for releasably fastening said flails to said drum comprising a plurality of circumferentially spaced, elongated inverted U-shaped channel members fixed to the exterior of the drum parallel to the axis thereof, each of said channel members having a plurality of spaced elongated slots therethrough of a size to permit the insertion of the arms of said hanger members into the interior of said channel members, a recess in the elongated side of each of said slots, said body part of each of said hanger members being received in a recess with said arms registering with the inner wall of said channel member longitudinally on either side of said recess, and a continuous rod like member slidably received in each of said channel members and in substantial alignment with said slots to prevent movement of the hanger members from the respective recesses in the direction of said slots.

3. The cutter of claim 2 wherein said recesses are disposed centrally in the side of each of said slots.

4. The cutter of claim 2 wherein said hanger member comprises a central U-shaped body portion having an outer end part operatively connected to said cutter element and a pair of vertical legs integral with said outer end part, said legs having outwardly bent inner end parts defining said oppositely extending transverse arms.

5. A flail type cutter having a drum-like blade carrier rotatable on a horizontal axis, a plurality of flails, and means releasably locking said flails to said drum, said locking means comprising hangers, each having a central part and lateral arms extending away from said central part at one end thereof, cutter means operatively connected to the opposite end of said central part, slots in said carrier adapted to receive said arms, said slots being arranged in circumferentially spaced rows parallel to the axis of said carrier, recesses communicating with a side of each of said slots and receiving the central part of each of said hangers, a continuous rod movable into a locking position in substantial radial alignment with all of the slots in a row thereof and in circumferential abutment with the arms of each of said hangers, and means carried by said carrier for rigidly supporting each of said rods in its locking position.

6. A flail type cutter including a rotatable drum and a plurality of flails each including a hanger member of substantial U-shaped configuration including an outer end part, a cutter element operatively connected to said end part, a pair of spaced upstanding leg parts integral with said end part, and oppositely extending arm parts at the upper ends of the leg parts, means for releasably fastening said flails to said drums comprising a plurality of circumferentially spaced elongated channel members integral with said drums, said channel members having a plurality of spaced, aligned, elongated slots therein adapted to receive the arm parts of said hanger members, recesses in a side of each of said elongated slots, said recesses receiving the leg parts of said U-shaped hanger members with the respective arms thereof engaging the inner walls of said channel members adjacent said recesses, and an elongated rod slidably received in each of said channel members and engaging said arm parts to prevent the displacement of said leg parts of said hangers from said recesses toward said slots.

7. A flail type cutter including a rotatable drum and a plurality of flails, each of said flails comprising a hanger member, means at the inner end of said hanger member for pivotally connecting the same to the periphery of the drum, a cutting element comprising a relatively shallow frusto-conical member having a co-axial opening at its smaller upper end and a knife edge about the entire periphery of its large end, support means for said cutting element comprising a pair of back-to-back sheet metal members extending axially upwardly through said hole, the transverse dimensions of said members being only slightly less than the diameter of said opening, the lower end of each of said members being bent outwardly to co-operatively afford a pivot seat for engaging the inner surface of said frusto-conical cutting member, and registering openings at the upper end of each of said members for swingable connection with said hanger member.

8. A cutter in accordance with claim 7 wherein each of said support members has freedom of movement with respect to its mating support member.

9. The cutter of claim 8 wherein the outturned parts of said support members are arcuate in cross-section to substantially conform to the curvature of the inner surface of the frusto-conical cutting member.

10. A flail type cutter in accordance with claim 7 including a splitter blade sandwiched between said support members.

11. A flail type cutter including a rotatable drum and a plurality of flails each including a hanger member of substantial U-shaped configuration including an outer end part, a cutter element operatively connected to said end part, a pair of spaced upstanding leg parts integral with said end part, and oppositely extending arm parts at the upper ends of the leg parts, means for releasably fastening said flails to said drum comprising a plurality of circumferentially spaced elongated channel members integral with said drums, said channel members having a plurality of spaced, aligned elongated slots therein adapted to receive the arm parts of said hanger members, said slots being recessed on one of their longitudinal sides to provide inwardly projecting parts of said channel members over which said arm parts engage, an elongated rod slidably received in each of said channel members and engaged with said arm parts to prevent the displacement of said arm parts away from said inwardly projecting parts of said channel members, and means for releasably retaining said rods against longitudinal displacement from said channel members, said means comprising an axially extending projection rigidly carried at one end of said drum, plate means slidably received on said axially extending projection, spring means urging said plate means at all times axially toward said drum, said plate means being rotatable among a plurality of positions, and including parts which extend over the ends of said rods when in one position to prevent the axial displacement of said rods from said channel members, said plate means including at least one other part which is radially clear of the ends of said rods when in another position, whereby the end of at least one of said rods may be exposed for axial displacement from its channel member when said plate means is rotated.

12. In a flail cutter including a rotatable drum, a plurality of flails each including a hanger member having inner and outer ends, a cutter element at the outer end of each of said hanger members, a plurality of axially extending rods slidably received in said drum adjacent the periphery thereof, means at the inner ends of said hanger members co-operating with said rods for releasable rocking attachment of said hanger members with said drum, said last named means including means permitting detachment of said hanger members from said drum upon axial displacement of said rods clear of said hanger members, and means for releasably retaining said rods against axial displacement with respect to said drum and comprising an axially extending projection rigidly carried at one end of said drum, plate means slidably received on said axially extending projection, spring means urging said plate means at all times axially toward said drum, said plate means being rotatable on said axially extending projection among a plurality of positions and including parts which extend over the ends of said rods when in a first position to prevent axial displacement of said rods from said drum, said plate including at least one other part which is radially clear of the ends of said rods when in another position; whereby the end of at least one of said rods may be exposed for axial displacement of said rod from said drum when said plate is rotated.

13. In the flail cutter of claim 12 wherein the ends of said rods adjacent said plate means project beyond the end of said drum and wherein said plate means has a plurality of spherical recesses pressed therein and engageable with the ends of said rods whereby said plate means is releasably restrained against accidental rotation with respect to said rods.

14. In the flail cutter of claim 12 wherein the edge of said cut away portion is sloped outwardly away from the ends of said rods whereby said sloping edge serves as a cam to ride over the end of an adjacent rod when said plate means is rotated from a rod releasing to a rod retaining position.

15. A flail type cutter including a transversely rotatable carrier and a plurality of flails, each flail comprising a hanger member having a cutter element connected to the outer end thereof, laterally extending parts at the inner ends of said hanger members, said carrier having a plurality of openings of a size to receive therein the laterally extending parts of said hanger members, said opening including recessed portions receiving the inner ends of said hanger members with the laterally extending parts thereof rockingly engaging the interior of the carrier adjacent the recessed portions, rod means within said carrier in close adjacency with the laterally extending parts of said hanger members to retain said parts in said recessed portions, and means within said carrier slidably supporting said rod means to enable the same to be slid clear of said laterally extending parts and permit removal of said end parts through the non-recessed portions of said openings.

References Cited by the Examiner

UNITED STATES PATENTS

| 1,862,035 | 7/1932 | Rainwater. |
| 2,597,485 | 5/1952 | Hillyer _____ 172—45 X |
| 3,122,871 | 3/1964 | Frevik et al. _____ 56—294 |

FOREIGN PATENTS

| 221,888 | 6/1959 | Australia. |
| 1,244,882 | 9/1960 | France. |

ABRAHAM G. STONE, *Primary Examiner.*